US008596783B1

(12) United States Patent
Finley

(10) Patent No.: US 8,596,783 B1
(45) Date of Patent: Dec. 3, 2013

(54) LIGHT CONTROL SYSTEM AND ASSOCIATED METHODS

(76) Inventor: Michael Cain Finley, Roswell, GA (US)

(*) Notice: Subject to any disclaimer, the term of this patent is extended or adjusted under 35 U.S.C. 154(b) by 1177 days.

(21) Appl. No.: 11/933,825

(22) Filed: Nov. 1, 2007

Related U.S. Application Data

(60) Provisional application No. 60/868,700, filed on Dec. 5, 2006.

(51) Int. Cl.
*G02C 7/12* (2006.01)

(52) U.S. Cl.
USPC ............ 351/159.56; 351/49; 351/159.27; 351/159.73

(58) Field of Classification Search
USPC ............ 351/49, 177, 159.27, 159.56, 159.73
See application file for complete search history.

(56) References Cited

U.S. PATENT DOCUMENTS

| | | | |
|---|---|---|---|
| 2,334,446 A * | 11/1943 | Serrell .................. | 351/49 |
| 2,813,459 A | 11/1957 | Archambault | |
| 3,211,047 A * | 10/1965 | Hermann .................. | 359/489 |
| 3,245,315 A | 4/1966 | Marks et al. | |
| 3,833,913 A | 9/1974 | Wick et al. | |
| 3,918,796 A | 11/1975 | Fergason | |
| 4,943,152 A | 7/1990 | Whelen | |
| 5,515,186 A | 5/1996 | Fergason et al. | |
| 6,056,397 A | 5/2000 | Berlad | |
| 6,984,038 B2 | 1/2006 | Ishak | |
| 7,004,583 B2 | 2/2006 | Miniutti et al. | |
| 7,044,599 B2 | 5/2006 | Kumar et al. | |
| 7,044,600 B2 | 5/2006 | Kumar et al. | |
| 7,066,596 B2 | 6/2006 | Ishak | |
| 7,097,303 B2 | 8/2006 | Kumar et al. | |
| 7,097,304 B2 | 8/2006 | Kumar et al. | |
| 7,101,043 B2 | 9/2006 | Kumar et al. | |
| 7,232,594 B2 | 6/2007 | Miroshin et al. | |
| 7,239,446 B2 | 7/2007 | Kreuzer | |
| 2002/0167727 A1 | 11/2002 | Hansen et al. | |
| 2003/0142400 A1 | 7/2003 | Hansen et al. | |
| 2005/0007548 A1 | 1/2005 | Ishak | |
| 2005/0012998 A1 | 1/2005 | Kumar et al. | |
| 2005/0018131 A1 | 1/2005 | Ishak | |
| 2005/0151926 A1 | 7/2005 | Kumar et al. | |
| 2006/0028614 A1 | 2/2006 | Kumar et al. | |
| 2006/0028615 A1 | 2/2006 | Kumar et al. | |
| 2006/0055879 A1 | 3/2006 | Kumar et al. | |
| 2006/0055880 A1 | 3/2006 | Kumar et al. | |
| 2006/0092374 A1 | 5/2006 | Ishak | |
| 2007/0146574 A1 * | 6/2007 | Giraudet ............... | 349/86 |
| 2007/0177099 A1 * | 8/2007 | Begon et al. ............... | 351/159 |
| 2008/0252846 A1 * | 10/2008 | Biver et al. ............... | 351/163 |

* cited by examiner

FOREIGN PATENT DOCUMENTS

WO  WO 2005098520 A1 * 10/2005
WO  WO 2005101099 A1 * 10/2005

OTHER PUBLICATIONS

Translation of WO 2005/101099 Giraudet Oct. 2005.*
Translation of WO 2005/098520 Begon et al Oct. 2005.*

*Primary Examiner* — Scott J Sugarman
(74) *Attorney, Agent, or Firm* — Douglas J Visnius

(57) ABSTRACT

A light control system including a lens may also include a first portion carried by the lens to filter a first polarized light, and a first central region within the first portion. The light control system may further include a second portion carried by the lens to filter a second polarized light, and a second central region within the second portion. The first portion may not substantially be in series with the second portion, and the first central region may not be substantially in series with the second central region.

5 Claims, 14 Drawing Sheets

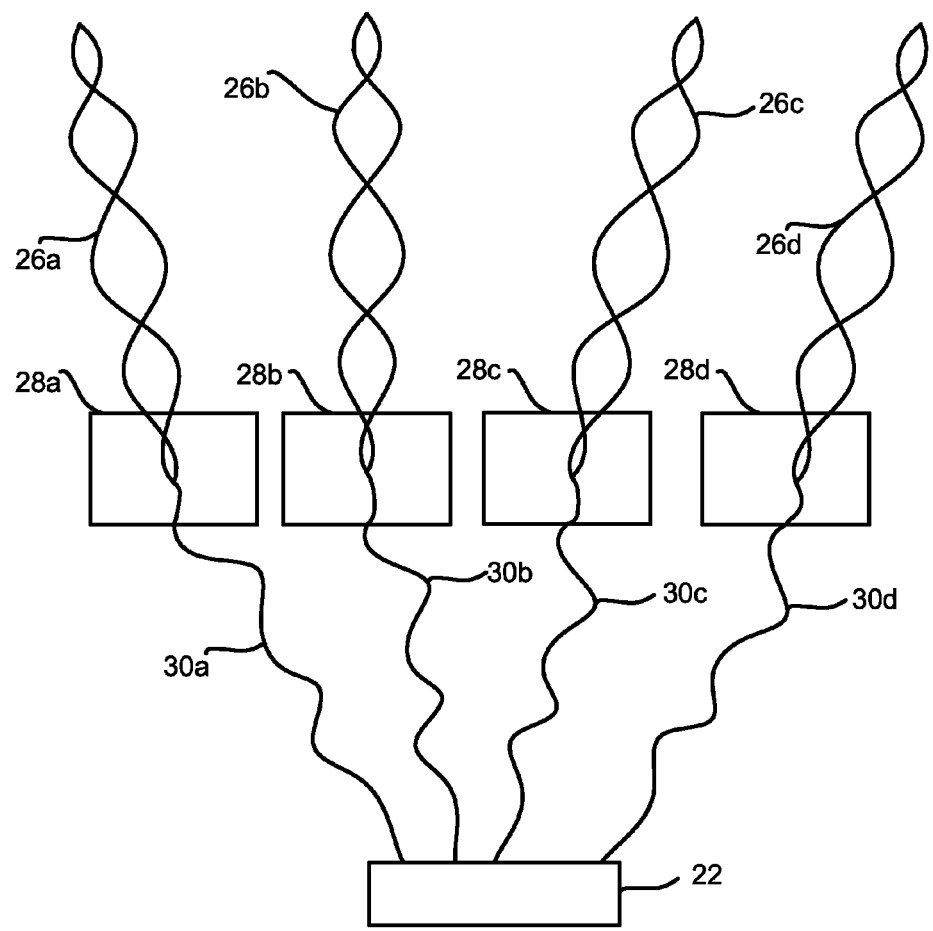
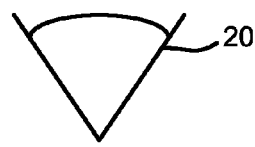
FIG. 5

LIGHT CONTROL SYSTEM AND ASSOCIATED METHODS

RELATED APPLICATION

This application is based upon, and claims priority to, prior filed copending provisional application Ser. No. 60/868,700 filed Dec. 5, 2006, the entire subject matter of which is incorporated herein by reference in its entirety.

FIELD OF THE INVENTION

The invention relates generally to the field of light control systems, and particularly to the areas of light control through lens design.

BACKGROUND OF THE INVENTION

Plane polarized lenses may be used in sunglasses that are specific to activities at or near the surface of water to reduce the glare of the reflected sun light from the water's surface. Generally speaking this has the double purpose of allowing greater visibility to events or objects below the surface of the water, as well as to reduce stress on the eyes of the observer or sensors of the observation equipment.

Similar effects and uses are found elsewhere where reflective surfaces abound, such as in snow-covered landscapes or driving. Note that this is not a question of generally darkening the landscape but rather of removing selected light which is incident from uninteresting reflections (glare) rather than from objects that are being viewed.

Commonly available sunglasses include lenses of uniform polarization meaning that all points of the lens block light that is polarized in the same plane. This specific plane is chosen to absorb the most light possible in the most general case possible.

For example, FIG. 1 illustrates a polarized set of sunglasses including a common polarization angle throughout the lens. In this case, glare is blocked from reflections based on the directional source of the light because specific sources can reflect from surfaces that will create this polarization angle once reflected.

SUMMARY OF THE INVENTION

Advantages in accordance with various embodiments of the invention are provided by a light control system. The light control system may include a lens, and a first portion carried by the lens to filter a first polarized light. There may be a first central region within the first portion. The light control system may further include a second portion carried by the lens to filter a second polarized light. There may be a second central region within the second portion. In addition, the first portion may not substantially be in series with the second portion, and the first central region may not be substantially in series with the second central region.

The first portion and the second portion may lie in a single plane of the light control system. Further, the single plane may be curved.

The first portion may lie in a first plane and the second portion may lie in a second plane that is in spaced relation with the first plane. The first plane may be curved and the second plane may be substantially parallel to the first plane.

Another portion may be rotatably mounted with respect to the first portion. The first portion and the second portion may lie on opposite sides of the lens, with the first portion's light filtering mirroring the second portion's light filtering.

The light control system may further include at least one other portion carried by the lens to filter at least one other polarized light, and the at least one other portion may not be substantially in series with the first portion and/or the second portion. The at least one other portion, the first portion, and the second portion may lie in a single plane.

In addition, the single plane may be curved. The first portion may lie in a first plane and the second portion may lie in a second plane that is in spaced relation with the first plane. The first plane may be curved, and the second plane may be substantially parallel to the first plane.

The light control system may further include a plurality of lens where the first portion lies on one of the plurality of lens. Further, the second portion may lie on another of the plurality of lens, and the first portion's light filtering may mirror the second portion's light filtering.

The light control system with the plurality of lens may include a first portion carried by one of the plurality of lens to filter a first polarized light. In addition, a second portion may be carried by another of the plurality of lens to filter a second polarized light. The first portion's light filtering may mirror the second portion's light filtering. Such a light control system may also include an eyeglass-frame to carry the plurality of lens.

Another aspect of the invention is a method for light control. The method may include positioning a first portion of a lens to not be substantially in series with a second portion. The method may also include filtering a first polarized light with the first portion. The method may further include filtering a second polarized light with the second portion.

BRIEF DESCRIPTION OF THE DRAWINGS

FIG. 5 illustrates a block diagram of multiple reflective surfaces sharing parallel horizontal orientations.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. As will be appreciated by one skilled in the art, the invention may be embodied as a method, system, and/or apparatus.

Figure 2:
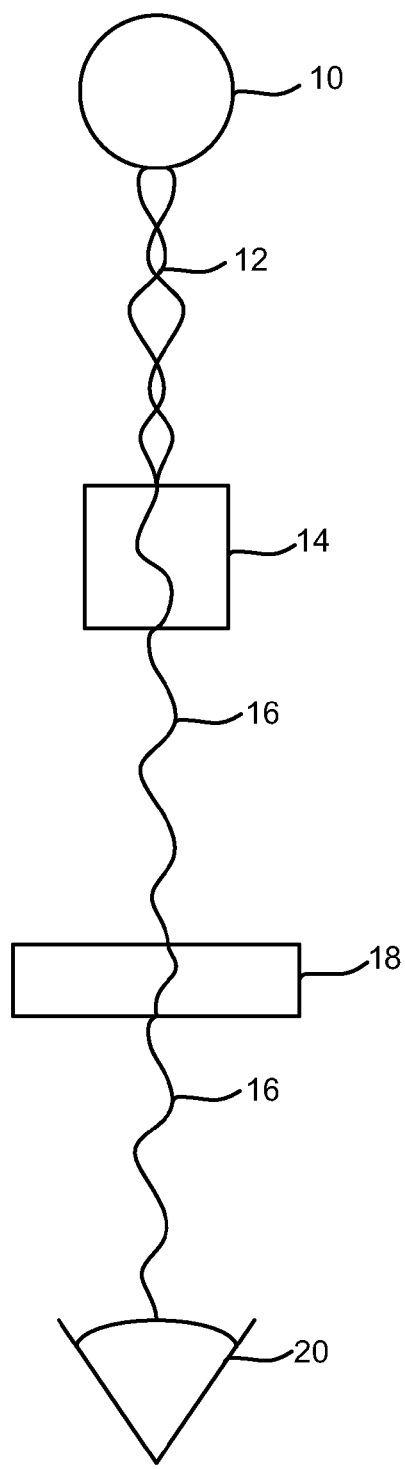
FIG. 2 illustrates a block diagram of a reflective surface polarizing light that is then transmitted by a lens.
Figure 3:
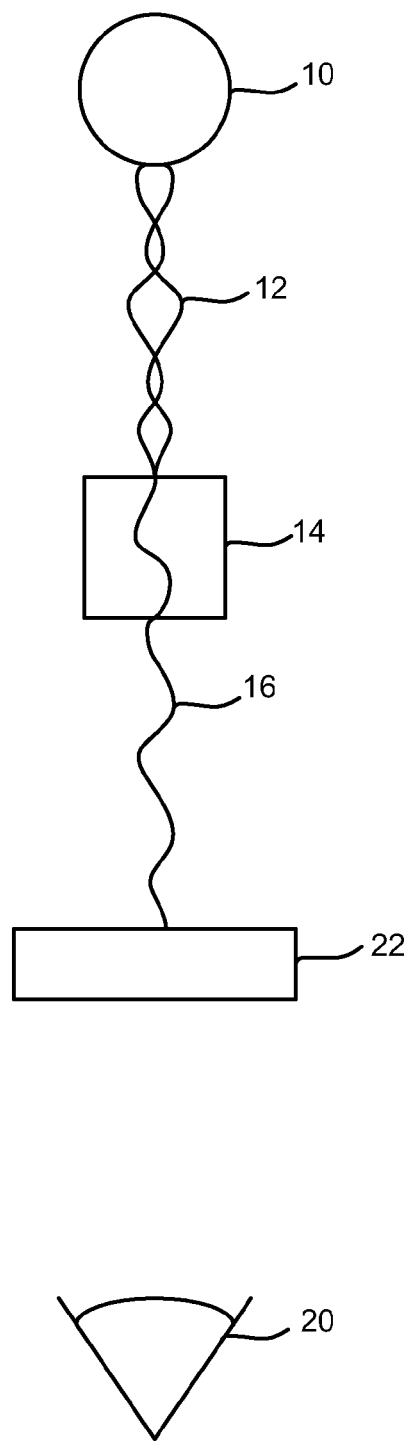
FIG. 3 illustrates a block diagram of polarized light matching the polarization of a polarized lens being absorbed.
Figure 4:
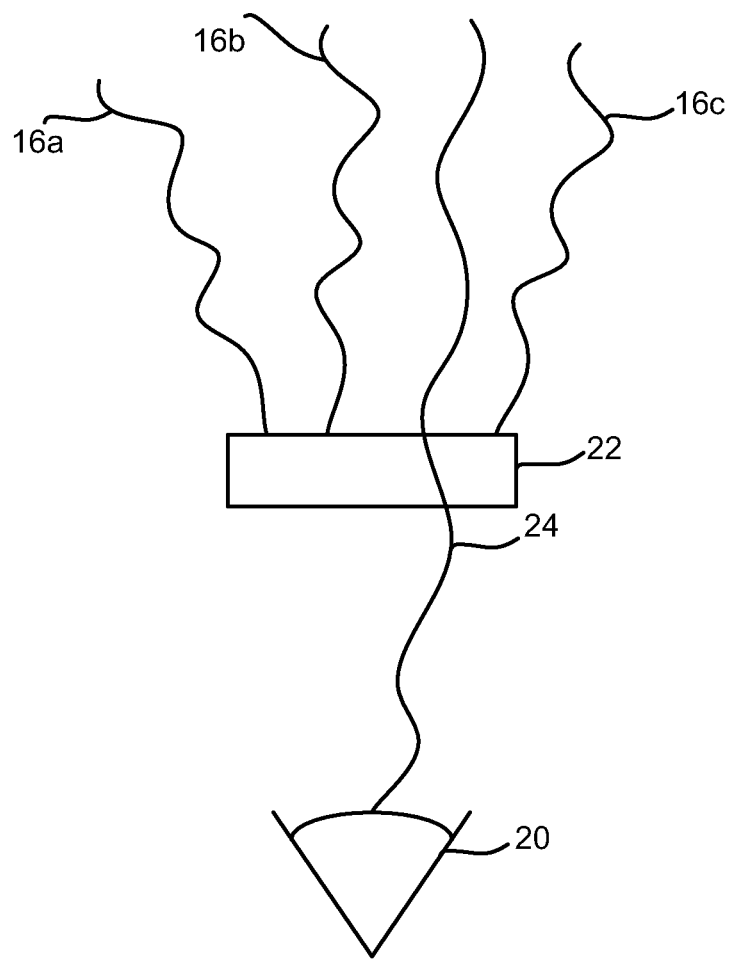
FIG. 4 illustrates a block diagram of polarized light matching the polarization of a polarized lens being absorbed while non-matching polarized light is not absorbed.

Referring initially to FIGS. 2-4, a general discussion of light control involving a lens is now described. In FIG. 2, a light source 10, such as the sun, provides unpolarized light 12 to a reflective surface 14. As a result, a light polarized by reflection 16 (glare) is directed towards, and through, an unpolarized lens 18 into a light receptor 20. The light receptor 20 may be an observer's eye, a light sensor, or the like.

FIG. 3 considers an alternative case in which the light polarized by reflection 16 (glare) is directed towards, and through, a polarized lens 22 instead of the unpolarized lens 18. In this case, the light polarized by reflection 16 (glare) is absorbed and/or filtered out by the polarized lens 22 before reaching the light receptor 20.

Assuming there is a plurality of light polarized by reflection 16 and with reference to FIG. 4, the polarized lens 22 absorbs the plurality of light polarized by reflections 16a-16c if the polarization of the light polarized by reflections matches the polarization of the polarized lens 22. For instance, the plurality of light polarized by reflections 16a-16c is absorbed by the polarized lens 22 because the polarization of the light polarized by reflections matches the polarization of the polarized lens. In addition, other light polarized by reflection 24 is not absorbed and/or filtered by the polarized lens 22 because the polarization of the other light polarized by reflection fails to match the polarization of the polarized lens.

Figure 1:
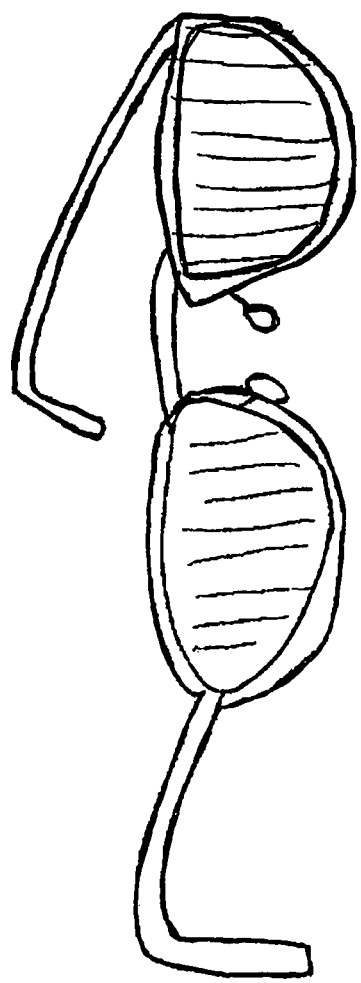
FIG. 1 illustrates a set of polarized sunglasses as found in the prior art.

In another case, and with reference to FIG. 5, light from multiple sources 26a-26d that is unpolarized may individually be directed by a respective one of multiple reflective surfaces 28a-28d towards the polarized lens 22. In this case, the multiple reflective surfaces 28a-28d share parallel horizontal orientations and therefore produce further light polarized by reflections 30a-30d having matching polarizations. As a result, if the polarization of the polarized lens 22 matches the polarization of any of the further light polarized by reflections 30a-30d, then the light polarized by reflections will be absorbed by the polarized lens. In other words, the polarization of each of the further light polarized by reflections 30a-30d match each other as well as the polarization of the polarized lens 22. Standard polarized sunglasses, e.g. FIG. 1, work in this manner.

However, this approach leaves much to be desired in terms of occluding glare. Peripheral glare, or glare from reflections outside of the specific focus of the wearer's eye, is less efficiently blocked.

Figure 6:
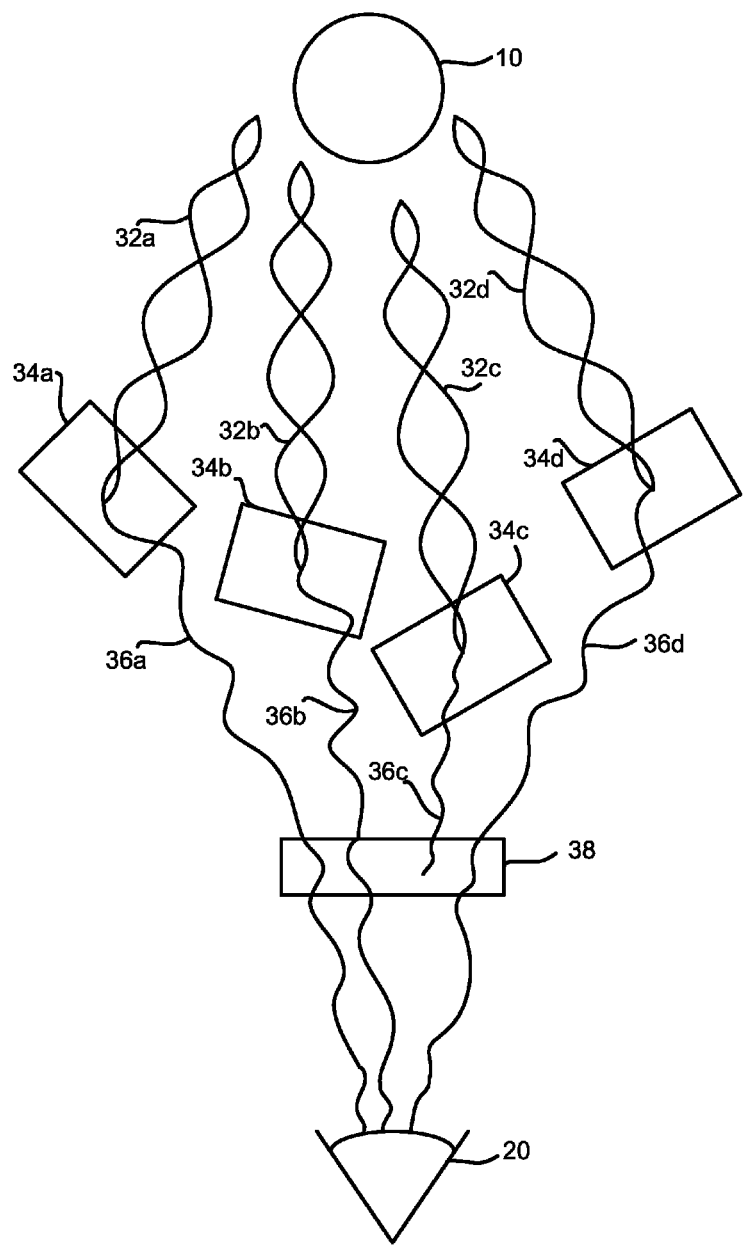
FIG. 6 is a block diagram illustrating that a single light source can provide unpolarized lights to multiple reflective surfaces.

For example, with reference to FIG. 6, a single light source 10 can provide unpolarized lights 32a-32d to other multiple reflective surfaces 34a-34d. In this case, the other multiple reflective surfaces 34a-34d do not share a parallel horizontal orientation. As such, polarized lights 36a-36d that do not share a common polar orientation is produced from a single light source 10.

The polarized lights 36a-36d are directed towards a recipient polarized lens 38. The polarization of the recipient polarized lens 38 only matches the polarization of the polarized light 36c and therefore the polarized light 36c is absorbed and/or filtered out by the recipient polarized lens. However, the polarization of the recipient polarized lens 38 does not match the polarization of the polarized lights 36a, 36b, and 36d and therefore the polarized lights 36a, 36b, and 36d are not absorbed and/or filtered out by the recipient polarized lens and enter into the light receptor 20. Stated another way, the recipient polarized lens 38 blocks only some of the glare produced by the polarized lights 36a-36d.

This problem is due to the fact that the geometry of eye (e.g. light receptor 20), lens, reflective surface, and light source are not conducive to the overly simplified approach that is generally used to design sunglass lenses. Most current designs ignore the fact that glare reflecting from surfaces anywhere in the field of view can be such that it will arrive at the lens and be transmitted to the eye. Instead, most current designs use the simplified view of a single polarization plane which is adequate for the largest area of reflection and the greatest amount of focus by the wearer.

An alternative and improved design for polarized lenses relies on a polarization pattern in the lenses of sunglasses that does not absorb light of the same polarization throughout the lens. Instead, the lens is assumed to be part of a system including a myriad of reflective surfaces and the wearer's eye. In this system, the lens is polarized in a specific pattern such that glare which is on a path from a reflected surface to the wearer's eye in a specific application is most likely absorbed.

Figure 7:
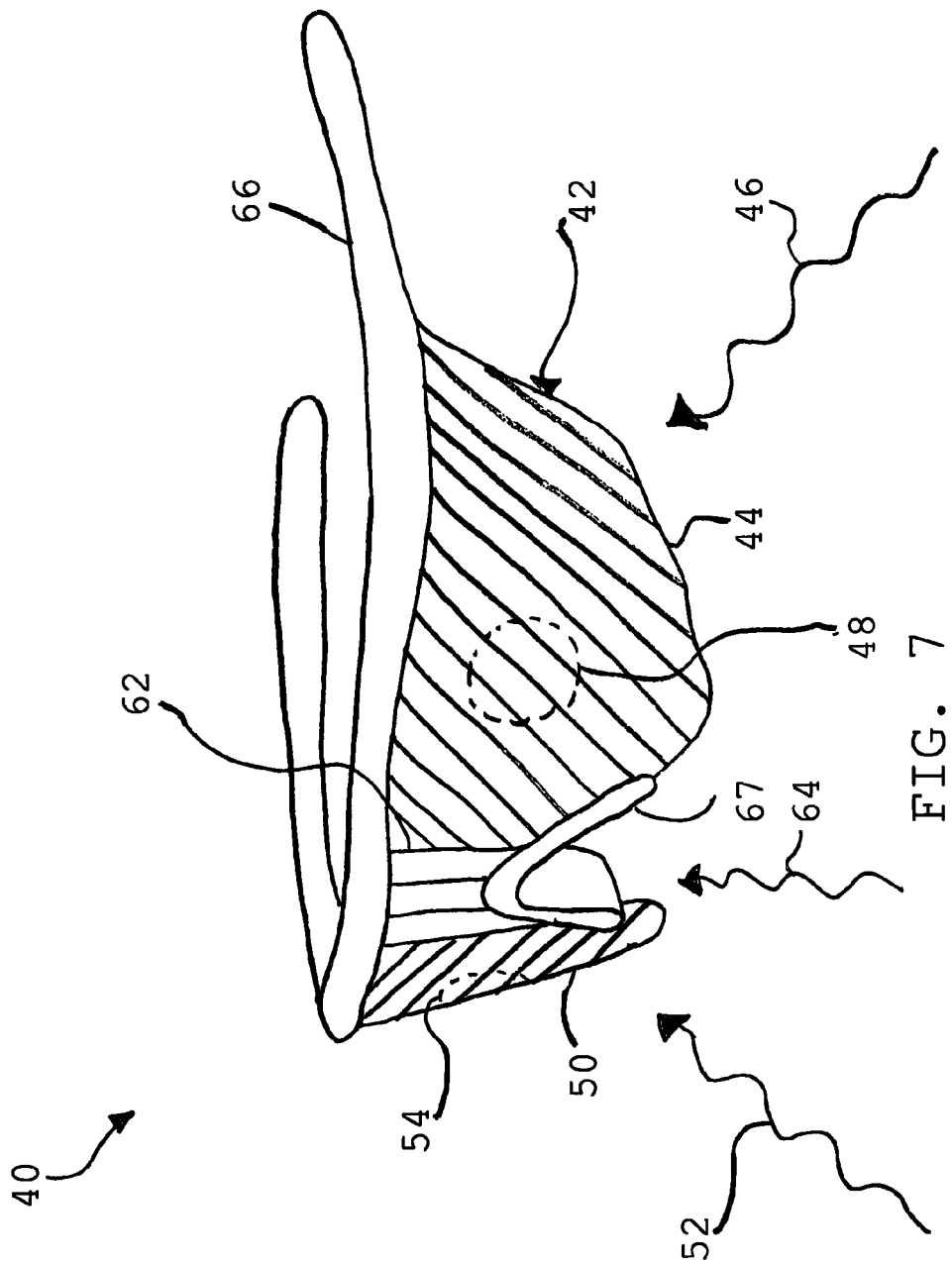
FIG. 7 is a frontal view of a light control system in accordance with one embodiment of the invention.
Figure 8:
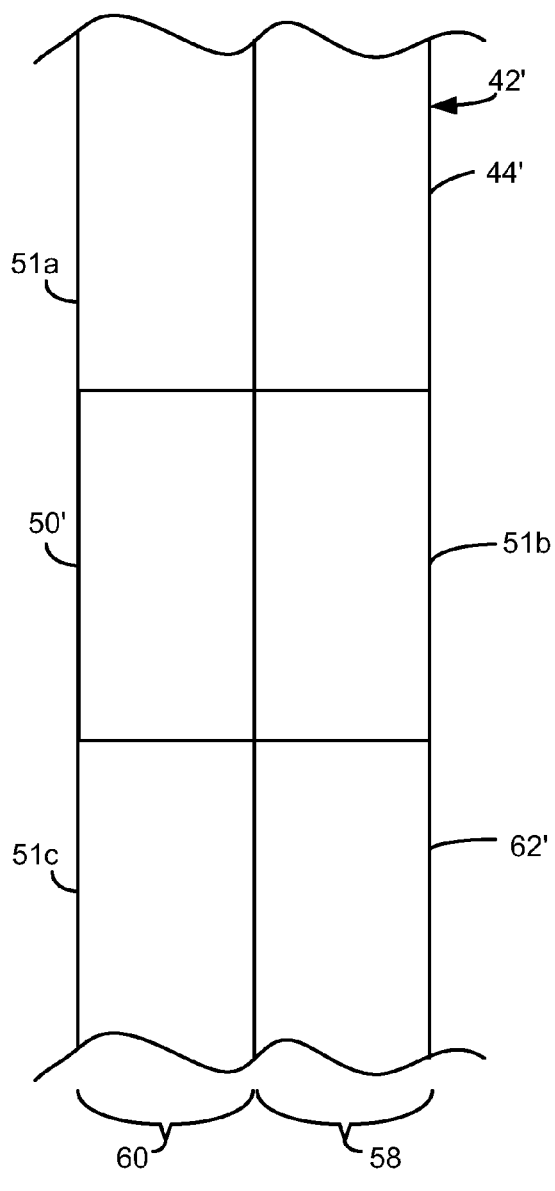
FIG. 8 is a partial cross-sectional block diagram illustrating a lens as shown in FIG. 7.
Figure 9:
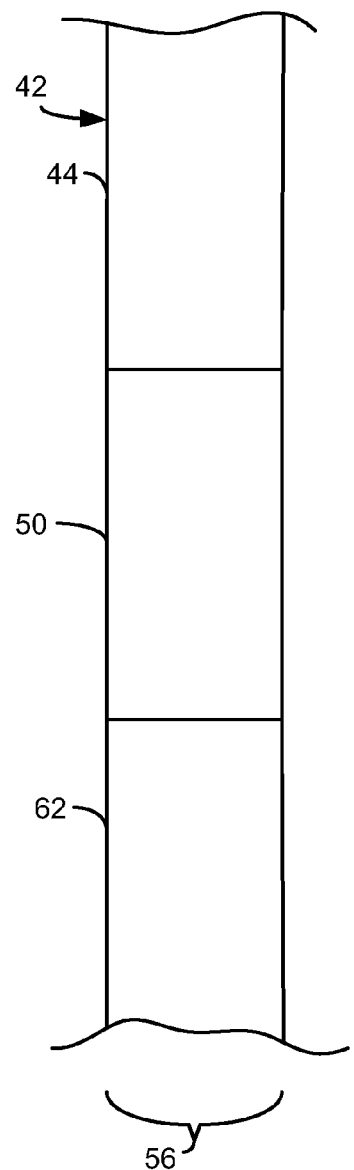
FIG. 9 is a different embodiment of a partial cross-sectional block diagram illustrating a lens as shown in FIG. 7.

The pattern of polarization of the lens specifically addresses the angle of polarization for chosen glare absorption at each point on the lens. Such a light control system 40 is initially described with reference to FIGS. 7-9. The light control system 40 includes a lens 42, and a first portion 44 carried by the lens to filter a first polarized light 46, for example. There is a first central region 48 within the first portion 44 that lies at or near the center of the first portion, for instance. The light control system 40 further includes a second portion 50 carried by the lens 42 to filter a second polarized light 52, for example. There is a second central region 54 within the second portion 50 that lies at or near the center of the second portion, for instance. In addition, the first portion 44 is not substantially in series with the second portion 50, and the first central region 48 is not substantially in series with the second central region 54, for example.

In one embodiment, the first portion 44 and the second portion 50 lie in a single plane 56 of the light control system 40. Further, the single plane 56 may be curved.

In another embodiment, the first portion 44 lies in a first plane 58 and the second portion 50 lies in a second plane 60 that is in spaced relation with the first plane. The first plane 58 is curved and the second plane 60 is substantially parallel to the first plane, for example. In another embodiment, unpolarized portions 51a-51c lie within the first plane 58 and the second plane 60 as will be appreciated by those of skill in the art.

In one embodiment, the first portion 44 and the second portion 50 lie on opposite sides of the lens 42, and the first portion's light filtering mirrors the second portion's light filtering. In another embodiment, the light control system 40 further includes at least one other portion 62 carried by the lens 42 to filter at least one other polarized light 64, and the at least one other portion may not be substantially in series with the first portion 44 and/or the second portion 50.

Additionally, the at least one other portion 62, the first portion 44, and the second portion 50 lie in a single plane 56. Furthermore, the single plane 56 may be curved. Moreover, the first portion 44 lies in a first plane 58 and the second portion 50 lies in a second plane 60 that is in spaced relation with the first plane, for example. In this embodiment, the first plane 58 is curved, and the second plane 60 is substantially parallel to the first plane, for instance.

The light control system 40 may also include an eyeglass-frame 66 to carry the lens 42. In addition, the light control system 40 may further include a nose bridge 67 as will be appreciated by those of skill in the art.

Accordingly, a light control system for occluding glare, especially peripheral glare, or glare from reflections outside of the specific focus of a wearer's eye, is more efficiently blocked. For instance, the retina of person's eye has a central area called the fovea which is dense and rich for receiving visual signals. In other words, the fovea is the part of the retina a person sees with, while non-foveal portions of the retina are more prone to sense contrast changes and movement without specific ability to form an image of what is being seen. These non-foveal portions of the retina escalate activity to the brain, which then demands attention and instructs the neck and eye muscles to move and look at the peripheral area by re-orienting the fovea when needed.

An important consideration is that if glare is incident on the non-foveal areas, then a person is essentially blind to movement in peripheral areas so the brain never gets an attention signal and never chooses to look in the peripheral areas. As a result, the new light control system 40 is anatomically validated because it allows the brain to get attention signals from regions that would previously be saturated by glare. Stated another way, these new attention signals provided by the light control system 40 should effectively enlarge the wearer's current field of sight perception.

Figure 10:
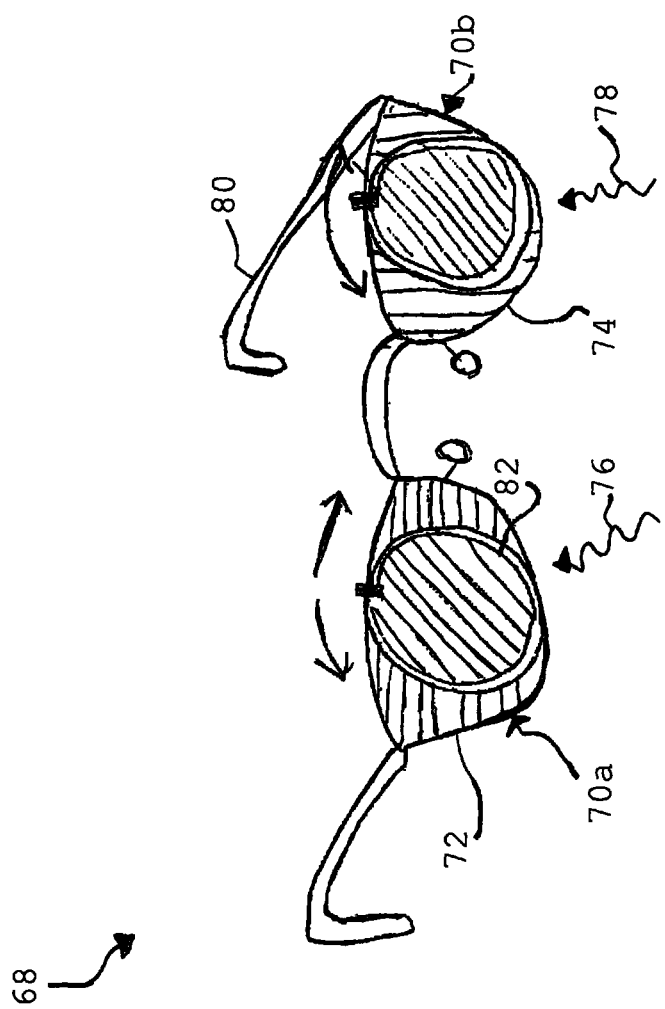
FIG. 10 is a frontal view of a light control system in accordance with one embodiment of the invention.

With additional reference to FIG. 10, in one embodiment, the light control system 68 further includes a plurality of lens 70a and 70b, and a first portion 72 lies on one of the plurality of lens. Further, the second portion 74 lies on another of the plurality of lens, and the first portion's 72 light filtering may mirror the second portion's 74 light filtering.

In another embodiment, the light control system 68 with the plurality of lens 70a and 70b includes a first portion 72 carried by one of the plurality of lens 70a to filter a first polarized light 76. In addition, the second portion 74, which is carried by another of the plurality of lens 70b, filters a second polarized light 78. The first portion's 72 light filtering mirrors the second portion's 74 light filtering, for instance. Such a light control system 68 may also include an eyeglass-frame 80 to carry the plurality of lens 70a and 70b.

In another embodiment, another portion 82 is rotatably mounted with respect to the first portion 72. In other words, the polarization of the lenses provides for field adaptation of the glasses by the wearer to substantially match the light conditions to the polarization potential of the glasses.

For instance, depending on the position of the light source, the angle at which incident glare in the central region of view is polarized will be altered, relative to the viewer. In this case, independent optimization by rotating the polarized material within the glasses frame until an optimal amount of glare is absorbed in the direction of observation can be achieved. By allowing each lens to be independently optimized, or coupling them together (mechanically or otherwise), the wearer's specific preference for improved absorption or simplicity of adjustment can be implemented.

Figure 11:
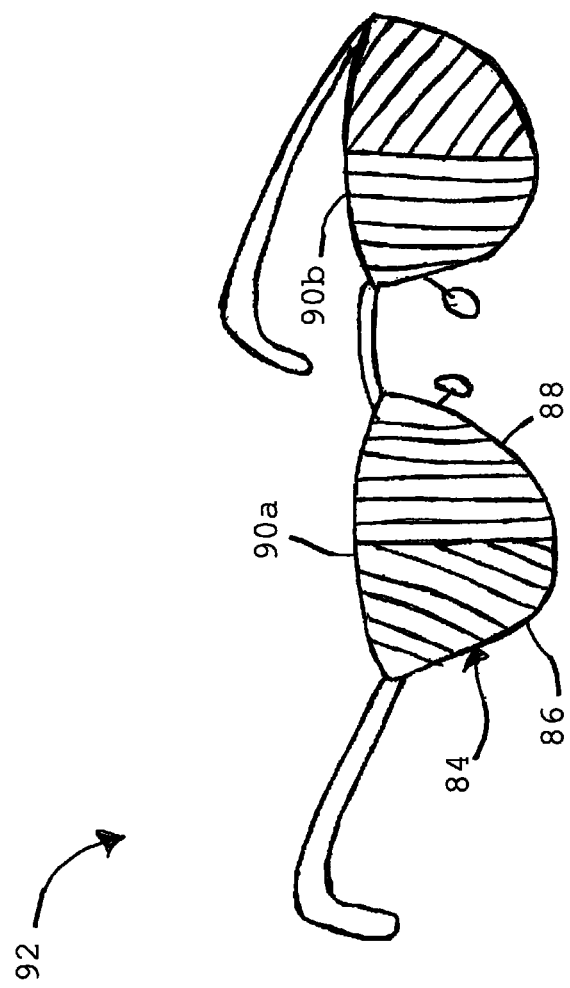
FIG. 11 is a frontal view of a light control system in accordance with one embodiment of the invention.

With additional reference to FIG. 11, another embodiment is described. In this embodiment, a lens 84 that includes more than one distinct polarization orientation in more than one portion of the lens' area, such as a "split" with the left portion 86 of the lens having one polarization angle and the right portion 88 of the same lens having a different polarization angle in a given eyepiece 90a and 90b. Such dual polarization glasses 92 block polarized glare from horizontal surfaces in the direction of gaze for a person wearing the dual polarization glasses. In addition, the dual polarization glasses 92 block polarized glare from peripheral surfaces that reflect glare from sources of light which are also in the direction of gaze of the wearer.

More broadly and based on the availability of specialized lens materials, the pattern of polarization angles can vary to a greater degree. Adaptations of the light control system 40 can be implemented for each target use, such as driving, snow activities, water activities, or the like.

Figure 12:
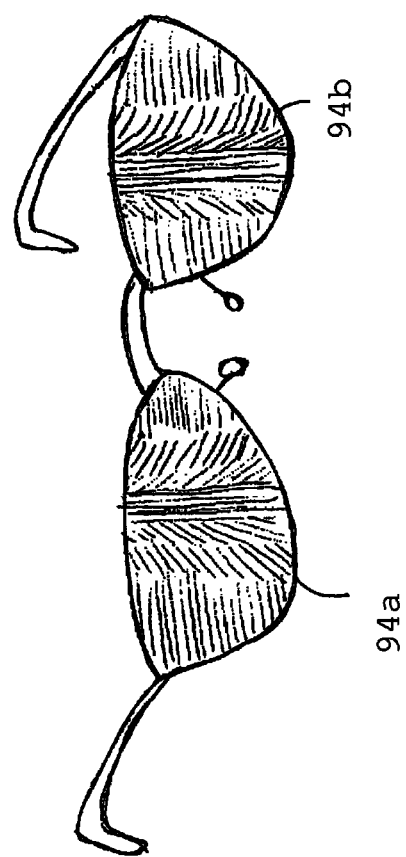
FIG. 12 is a frontal view of a light control system in accordance with one embodiment of the invention.

With additional reference to FIG. 12, another embodiment is described. In this embodiment, a complex pattern of polarization is adapted to a specific use, with specific polarization angles in continuous variation throughout the surface of each lens 94a and 94b.

Such an embodiment applies to the specific case of observing bodies of water, and/or sand or snow environments during daylight hours such as might be needed in sporting activities. The center of each lens is polarized in a small region using plane polarization as is standard in the art. This generally obstructs glare from the surface of the water which is horizontal directly in the line of site of the wearer. Laterally around this center, incident light necessarily arrives reflected from surfaces of varying angles that are caused by ripples and waves (referred to as disruptions) in the water's surface (or by sky scattering from above). By varying the polarization angle of the lens outward from its central orientation (reflections from horizontal surfaces) to the edge of the lens (increasingly vertical surfaces with reflective areas generally pointing glare toward the observer), a greater amount of glare is reduced.

Consider any plane that is orthogonal to the ideal level surface of the water that is being observed. For general light sources on this plane that reflect off of the water's surface, plane-polarized lenses will absorb glare, whether it's in the peripheral or central vision of the observer. If the primary light source is generally overhead, then glare reflections from the direction of the observer's gaze will be properly absorbed. But light hitting peripheral surfaces will generally be heading away from the observer and glare will only occur if the light is sent back by a reflective surface which cannot be horizontal and which is therefore not polarized in the same plane. In fact, the reflective surface must vary in orientation according to factors that are dependent on the circumstances, from zero to around 45°. This variation creates opportunity for application-specific polarization patterns based on distance, light source, and other conditions as are typically needed by consumers.

Regions of differing polarization on a single lens substrate can be created using standard polarization techniques in a series of treatments that each affects only a portion of the substrate area. Standard Polaroid film of polyvinyl alcohol plastic with iodine doping, for example, can be applied and oriented through stretching. By working with each desired region of polarization while other regions are masked, the correct orientation of each region of the final lens can be accurately manufactured.

Alternatively, a polarization "wire grid" pattern can be designed to vary the polarization angle smoothly across the lens. Lithographic techniques can then be used to shrink this design and apply it in the form of an appropriately small metallic grid. Other variations on these techniques, such as the use of metallic nano-particles in an aligned array, can result in an appropriate embodiment of the application.

Use of specialized materials and lens shapes can provide continuous variation in polarization so that the wearer does not distinguish specific bands of polarization. Similarly, different sizes of lenses call for different polarization levels between the center and the extremes. Variable polarized lenses can complement plane polarized or conventional polarized lenses in a single frame to create a general case and also a specific-application embodiment that is of added utility.

Figure 13:
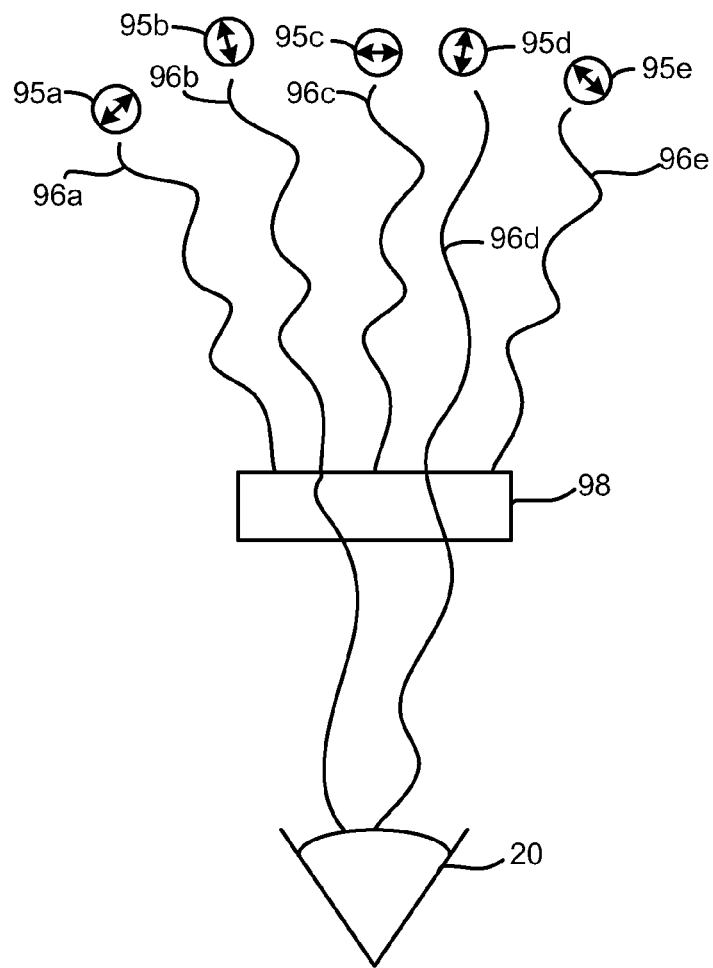
FIG. 13 illustrates a block diagram of polarized light matching the polarization of a polarized lens being absorbed while non-matching polarized light is not absorbed with polarization being oriented differently in different parts of the system in an outdoor application example.
Figure 14:
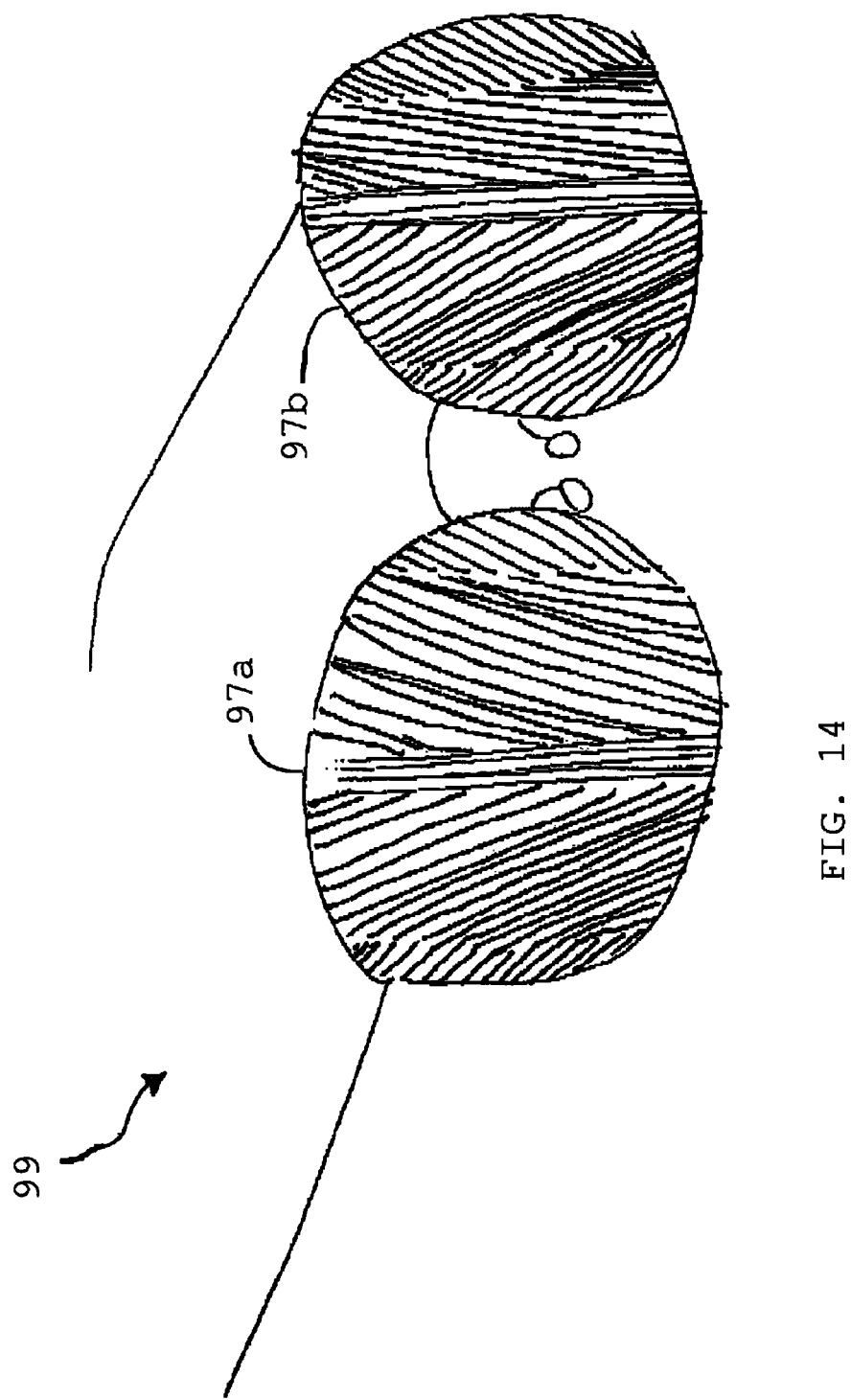
FIG. 14 is a frontal view of a light control system in accordance with the teaching of the invention according to FIG. 13.

A prophetic example is discussed with reference to FIGS. 13 and 14. The example is a polarization scenario for an outdoor water application where non-glare sources lack any coherent polarization pattern, and glare sources vary in polarization according to a typical pattern for a given environment. In this case, polarization symbols 95*a*-95*e* indicate how light 96*a*-96*e* is polarized in a specific plane, e.g. along the line of the double-ended arrow.

Under the foregoing circumstances, a lens 98 and or light control system 99, transmits light 96*b* and 96*d*, which are non-glare sources. The variable polarization on the different portions of the lens 98, 97*a* and 97*b* provides blockage of glare incident on the lens that would otherwise have been destined for the light receptor 20, e.g. the retina of a wearer or the photo sensitive element of a light sensor.

Figure 15:
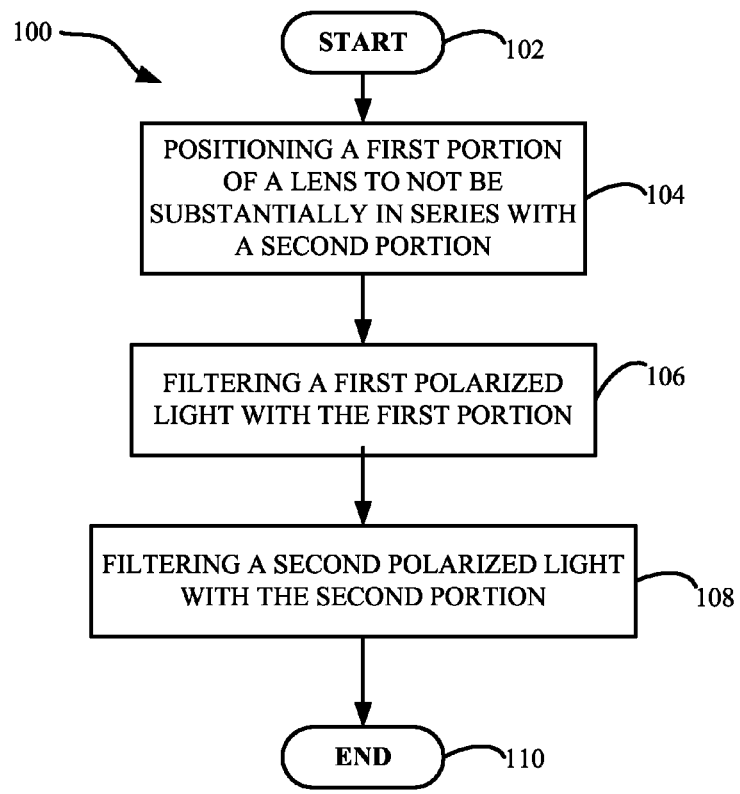
FIG. 15 is a flowchart illustrating a method in accordance with the invention.

Another aspect of the invention is a method for light control, which is now described with reference to flowchart 100 of FIG. 15. The method begins at Block 102 and may include positioning a first portion of a lens to not be substantially in series with a second portion at Block 104. The method may also include filtering a first polarized light with the first portion at Block 106. The method may further include filtering a second polarized light with the second portion at Block 108. The method ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A light control system comprising:
    a lens;
    a first portion substantially centered relative to its usage position on said lens, said first portion to filter a first polarized light;
    a second portion including one edge adjoining said first portion relative to its usage position on said lens, said second portion to filter a second polarized light; and
    a third portion including one edge adjoining said first portion relative to its usage position on said lens, said third portion to filter a third polarized light;
    said second portion and said third portion not substantially in series with said first portion relative to each portion's respective usage position.

2. The system of claim 1 wherein said first portion comprises plane polarization, and said second portion and said third portion comprises non-planar polarization.

3. The system of claim 1 wherein said third portion's light filtering mirrors said second portion's light filtering.

4. The system of claim 1 wherein said first portion, said second portion, and said third portion lie in a single plane.

5. The system of claim 4 wherein said single plane is curved.

* * * * *